United States Patent [19]

Dreinhoff

[11] Patent Number: 4,868,582

[45] Date of Patent: Sep. 19, 1989

[54] METHOD FOR FASHIONING INK CHANNELS IN A WRITE HEAD FOR A DOT-MATRIX INK PRINTER MEANS

[75] Inventor: Karl H. Dreinhoff, Berlin, Fed. Rep. of Germany

[73] Assignee: Siemens Aktiengesellschaft, Berlin and Munich, Fed. Rep. of Germany

[21] Appl. No.: 230,432

[22] Filed: Aug. 10, 1988

[30] Foreign Application Priority Data

Aug. 28, 1987 [DE] Fed. Rep. of Germany ....... 3729206

[51] Int. Cl.[4] .............................................. G01D 15/16

[52] U.S. Cl. ................................ 346/1.1; 346/140 R; 264/334; 264/232; 427/235

[58] Field of Search ................. 346/140, 1.1; 264/334, 264/232; 427/235, 230

[56] References Cited

U.S. PATENT DOCUMENTS

| | | | |
|---|---|---|---|
| 4,095,238 | 6/1978 | Kattner | 346/140 |
| 4,158,847 | 6/1979 | Heinzl | 346/140 |
| 4,248,823 | 2/1981 | Bader et al. | 264/334 X |
| 4,511,598 | 4/1985 | Creagh | 346/140 X |
| 4,725,862 | 2/1988 | Matsuzari | 346/140 |

FOREIGN PATENT DOCUMENTS

| | | |
|---|---|---|
| 0042932 | 1/1982 | European Pat. Off. . |
| 0145880 | 11/1983 | European Pat. Off. . |
| 0103841 | 3/1984 | European Pat. Off. . |
| OS2543420 | 3/1977 | Fed. Rep. of Germany . |
| PS2543451 | 3/1977 | Fed. Rep. of Germany . |
| 55-71572 | 5/1980 | Japan . |
| 1167690 | 10/1969 | United Kingdom . |

*Primary Examiner*—Joseph W. Hartary

*Attorney, Agent, or Firm*—Hill, Van Santen, Steadman & Simpson

[57] ABSTRACT

A method for fashioning ink channels in a write head for a dot-matrix ink printer means, whereby respective form needles cylindrically surrounded by piezo electric drive elements are aligned in a casting mold in accord with the desired course of the ink channels to be fashioned, are cast out with a casting compound and, after the curing of the latter, are removed upon formation of the respective ink channels partially surrounded by the allocated piezo electric drive elements, and insulation of the drive elements from a writing fluid in the ink channels is acheived in a way that is simple in terms of production engineering. The ink channels are filled with a liquid or dissolved plastic and are emptied after the inside channel walls are moistened with the plastic, so that a thin protective layer remains on the inside channel walls. The new method serves for the manufacture of ink printer heads that work based on the principle of individual drop ejection (drop on demand).

3 Claims, 1 Drawing Sheet

METHOD FOR FASHIONING INK CHANNELS IN A WRITE HEAD FOR A DOT-MATRIX INK PRINTER MEANS

BACKGROUND OF THE INVENTION

The invention is directed to a method for fashioning ink channels in a write head for a dot-matrix ink printer means whereby form needles respectively cylindrically surrounded by piezo electric drive elements are aligned in a casting mold in accord with the desired course of the ink channels to be fashioned, are cast out with a casting compound, and, after the curing of the latter, are removed upon formation of the ink channels respectively partially surrounded by the allocated, piezo electric drive elements.

Known write heads for dot-matric ink printer means (see German Patent No. 25 43 551) that work based on the principle of individual drop ejection (drop on demand) contain individually drivable tubes of piezo ceramic material as drive elements for the ejection of ink drops from ink channels, each of these tubes of piezo ceramic material respectively surrounding an ink channel proceeding in the inside of the write head, surrounding the latter over a part of its length; given selection or drive of one of the drive elements, this tube of piezo ceramic material constricts, whereby an ink drop is ejected from the allocated ink channel.

For constructing such a write head, German Patent No. 25 43 451 discloses that the drive elements be plugged onto form needles and the needles be aligned in a casting mold in accord with the desired course of the ink channels; subsequently, the casting mold is filled out with a casting compound and the form needles are removed after the casting compound has cured. In order to prevent the drive elements from coming into direct contact with the writing fluid in the ink channels, which can lead to the penetration of the writing fluid into the porous ceramic of the drive elements and to shorts resulting therefrom, small protective tubes of metal are plugged into the drive elements before they are cast out and are drawn onto the form needles together with the drive elements, so that the small protective tubes in the finished write head isolate the drive elements that surround them from the interior of the allocated ink channels. The relatively thick wall thickness of the small protective tubes required in view of the inherent stability of the small protective tubes, however, requires a relatively high selection energy for the drive elements. Further, the relatively thick wall thickness of the small protective tubes complicates the fan-in of the ink channels to form a tight channel exit grid (nozzle grid), particularly when the drive elements should be arranged as close as possible to the channel discharges of the ink channels.

In a modified method likewise disclosed by German Published Application No. 25 43 420 for fashioning the ink channels in the write head, the drive elements are plugged onto the appertaining form needle upon interposition of a respective wire helix, so that the casting compound penetrates into the interspaces between the drive elements and the appertaining form needles in the subsequent casting and thus forms a protective layer isolating the appertaining drive element from the inside of the channel. However, the homogeneity of the protective layer is disturbed by the wire helix, so that it is not impossible that particles of the casting compound can crumble off when the form needles are removed or later when the drive elements are driven, namely due to the pressure pulses resulting therefrom.

In a further modified method disclosed by German Published Application No. 25 43 420 for fashioning the ink channels in the write head, whereby the drive elements are each coated with an insulating layer before their arrangement and alignment in the casting mold, a sudden transition in the inside channel wall between the insulating layer and the cast member can arise in the immediate proximity of the drive elements when the casting mold is cast out, whereby the course of the pressure pulse in the writing fluid is deteriorated when the drive elements are driven. Further, cracks can arise at this location.

SUMMARY OF THE INVENTION

An object of the invention is to isolate the drive elements from the writing fluid in the ink channels in a simple way in terms of production engineering upon formation of continuously smooth inside walls of the channels.

This object is inventively achieved in that, in the method of the type first described above, the inside channel walls of the ink channels are subsequently coated with a thin protective layer.

The critical advantage of the method of the invention is that, due to the formation of the protective layer after the casting of the ink channels, a uniformly smooth channel wall is formed over the entire length of the ink channels, whereby cracks that have arisen during the curing of the casting compound due to shrinkage are filled out and the regions lying therebelow are protected against the penetration of writing fluid. Loosened wall regions of the inside channel walls as can particularly occur given employment of wire helices for electrical contacting of the drive elements and for their centering on the form needles in accord with German Published Application No. 25 43 420 are rejoined to the casting compound of the cast member; however, the employment of wire helices can generally be foregone because of the protective layer. Since, over and above this, an optimal smoothing of the channel walls is not critical before they are coated, the treatment of the form needles with a parting agent that is generally provided in order to facilitate their removal from the cast write head can also be foregone.

Particularly coming into consideration as material for the protective layer are plastics that are resistant to the writing fluid and impermeable, that are moistened by the writing fluid and that exhibit good adhesion to the casting compound.

In order to guarantee a uniform layer thickness when the protective layer is fashioned, the ink channels are preferably filled with a hardenable, liquid plastic and are emptied after the inside channel walls are moistened by the plastic. The emptying of the ink channels can ensue by dripping or by extracting the excess, liquid plastic, whereby a thin plastic layer remains on the inside channel walls and hardens upon formation of the protective layer.

Instead of employing a liquid plastic, the formation of the protective layer can ensue in the same way from a solution in that the ink channels are filled with a plastic dissolved in a solvent and are emptied after the inside channel walls are moistened with the plastic. After the emptying of the ink channels which can ensue by dripping, extraction, by blowing air saturated with solvents in or by rinsing with a solvent, a thin plastic layer forming the protective layer remains on the inside channel walls, this hardening after the evaporation of the solvent. It is thereby advantageous that an additional heating of the cast write head can be eliminated, so that a tension-free protective layer forms at room temperature.

BRIEF DESCRIPTION OF THE DRAWINGS

The figures of the drawing shall be referred to below for explaining the invention, whereby.

DESCRIPTION OF THE PREFERRED EMBODIMENTS

Figure 1:
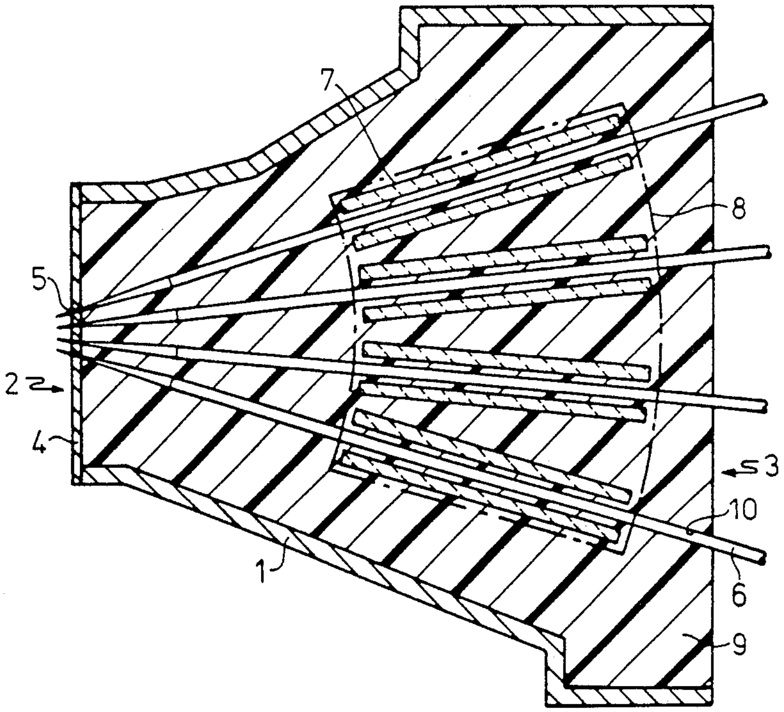
FIG. 1 shows a casting form with form needles positioned therein and drive elements carried by the form needles for casting a write head for a dot-matric ink printer means.

FIG. 1 shows an essentially funnel-shaped casting mold 1 comprising two funnel openings 2 and 3 of which the smaller funnel opening 2 is terminated with a centering plate 4. The centering plate 4 contains bores 5 corresponding to the desired arrangement of the channel discharges (nozzle arrangement) in the write head to be manufactured. Drive elements 7 composed of tubular piezo ceramics are plugged onto individual form needles 6. The form needles have their tips centered in the bores 5 of the centering plate 4 and are aligned inside the casting mold 1 in accord with the desired position of the ink channels to be fashioned in the write head. It is also possible to combine the drive elements 7 in a mount to form an assembly 8 that is merely indicated here by a dot-dash boundary, to secure the assembly 8 in the casting mold 1, and to conduct the individual form needles through the openings of the drive elements 7 into the bores 5 of the centering plate 4. Subsequently, the casting mold is filled with a casting compound (preferably casting resin) proceeding from its large funnel opening 3. After the casting compound has cured to form a cast member 9, the form needles 6 are withdrawn from the cast member 9, so that ink channels 10 therein remain respectively surrounded by one of the drive elements 7 over a part of their length.

Figure 2:
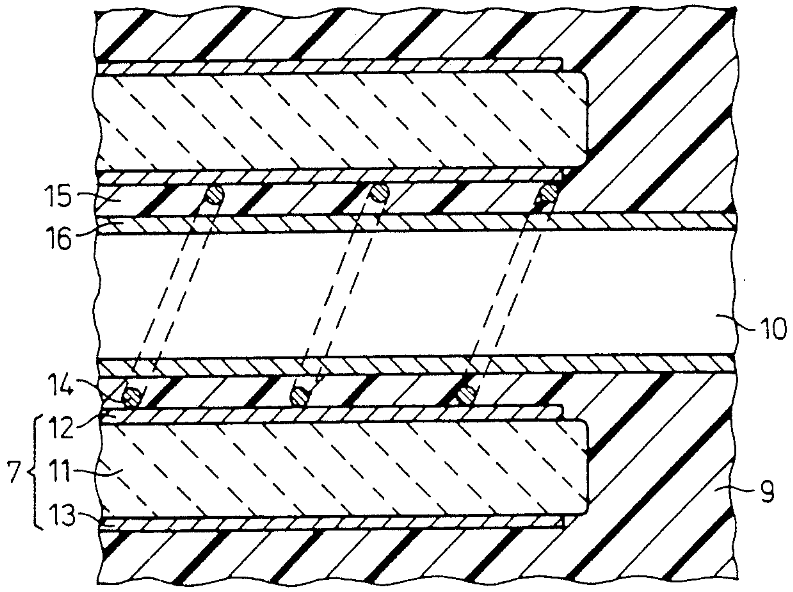
FIG. 2 shows a detail of FIG. 1 in the region of one of the driven elements.

FIG. 2 shows a detail of the cast member 1 in the region of one of the drive elements 7. The drive element 7 is composed of a tubular piezo ceramic member 11 that is provided with an inside electrode 12 and, respectively, an outside electrode 13 at its inside and outside. Given the example shown in FIG. 2, the drive element 7 was centered on the appertaining form needles 6 (FIG. 1) with a wire helix 14 serving as connecting line for the inside electrode 12, so that the region between the drive element 7 and the form needle 6 was filled out by the casting compound when the casting mold 1 was cast out. The shell 15 between the inside of the ink channel 10 and the drive element 7 protects the drive element 7 protects the drive element 7 against influences of the writing fluid contained in the ink channel 10. Due to the wire helix 14 that it has embedded, however, the homogeneity of the thin shell 15 is disrupted, so that it is not impossible that individual particles of the casting compound can crumble out of the shell 15 when the form needles 6 are removed or later when the drive elements 7 are driven. Further, unequal thermic shrinkages of the casting compound during the curing thereof and of the drive element 7 lead to stresses that can lead to the formation of cracks in the shell 15. For this reason, the inside channel walls of the ink channels 10 are coated with a thin protective layer 16 after the removal of the form needles 6. A resin on the basis of the casting compound set to low viscosity is particularly suitable as coating material. The ink channels 10 are first filled with the resin and, after the inside channel walls have been completely moistened, the excess resin is emptied out by extraction, whereby a thin wall layer forming the insulating layer 16 remains, this then curing. Instead of a resin, or respectively, liquid plastic, a plastic coat from a solution is also suitable. The channels 10 filled with a plastic solution for this purpose are emptied after complete moistening, whereby a thin layer remains as protective layer 16 after the evaporation of the solvent; this method does not require any heating of the cast member 9, so that a low-tension coating derives at room temperature.

Since the protective layer 16 itself offers protection of the drive element 17 from the writing fluid in the ink channels 10, the wire helix 14 can be eliminated given some other contacting of the inside electrode 12 other than on the basis of the wire helix 14.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method for fashioning ink channels in a write head for a dot-matrix ink printer means, whereby respective form needles cylindrically surrounded by piezo electric drive elements are aligned in a casting mold in accord with the desired course of the ink channels to be fashioned, are cast out with a casting compound and, after the curing of the latter, are removed upon formation of the respective ink channels partially surrounded by the allocated, piezo electric drive elements, comprising the step wherein the inside channel walls of the ink channels are subsequently coated with a thin protective layer.

2. A method according to claim 1, wherein for forming the protective layer the ink channels are filled with a hardenable, liquid plastic and are emptied after the inside channel walls are moistened with the plastic.

3. A method according to claim 1, wherein for forming the protective layer the ink channels are filled with a plastic dissolved in a solvent and are emptied after the inside channel walls are moistened with the plastic.

* * * * *